(12) United States Patent
Gronli

(10) Patent No.: US 8,322,242 B2
(45) Date of Patent: Dec. 4, 2012

(54) VELOCITY SUMMING LINEAR ACTUATOR

(75) Inventor: Timothy D. Gronli, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 338 days.

(21) Appl. No.: 12/569,211

(22) Filed: Sep. 29, 2009

(65) Prior Publication Data

US 2011/0072920 A1    Mar. 31, 2011

(51) Int. Cl.
*F16H 1/20* (2006.01)
*F16H 3/06* (2006.01)
*F16H 27/02* (2006.01)
*F16H 29/02* (2006.01)
*F16H 29/20* (2006.01)

(52) U.S. Cl. .................. 74/89.27; 74/89.29

(58) Field of Classification Search ............. 74/89.26, 74/89.27, 89.29, 89.39
See application file for complete search history.

(56) References Cited

U.S. PATENT DOCUMENTS

| | | | | |
|---|---|---|---|---|
| 215,483 A * | 5/1879 | Schenck | ................. | 100/290 |
| 1,797,809 A * | 3/1931 | Turrettini | ................. | 82/137 |
| 2,809,736 A * | 10/1957 | Hoover | ................. | 192/143 |
| 3,159,046 A * | 12/1964 | Harned et al. | ............... | 74/89.29 |
| 3,563,106 A * | 2/1971 | Goodman | ................. | 74/89.39 |
| 3,572,140 A * | 3/1971 | Gulick | ................. | 74/89.27 |
| 3,872,738 A * | 3/1975 | Price et al. | ................. | 475/5 |
| 4,270,404 A * | 6/1981 | Murakoshi et al. | ........ | 74/490.09 |
| 4,346,728 A * | 8/1982 | Sulzer | ................. | 137/243.6 |
| 4,852,479 A * | 8/1989 | Hubbard | ................. | 101/91 |
| 4,858,491 A * | 8/1989 | Shube | ................. | 74/665 B |
| 5,041,748 A | 8/1991 | Huber | | |
| 5,398,780 A | 3/1995 | Althof et al. | | |
| 5,472,065 A | 12/1995 | Vergin | | |
| 5,713,190 A | 2/1998 | Vermeulen et al. | | |
| 5,950,765 A | 9/1999 | Pearson et al. | | |
| 6,260,799 B1 | 7/2001 | Russ | | |
| 6,725,976 B2 | 4/2004 | Oh et al. | | |
| 6,928,894 B2 * | 8/2005 | Falcou et al. | ............... | 74/89.25 |
| 7,066,301 B2 | 6/2006 | Oh et al. | | |
| 7,163,239 B2 | 1/2007 | Fisher | | |
| 7,231,842 B2 * | 6/2007 | Biester et al. | ............... | 74/89.25 |
| 7,578,212 B2 | 8/2009 | Kleyman et al. | | |
| 2009/0308188 A1 * | 12/2009 | Yang et al. | ................. | 74/89.27 |
| 2010/0024580 A1 * | 2/2010 | Hadley et al. | ............... | 74/89.26 |
| 2010/0072842 A1 * | 3/2010 | Johnson et al. | ................. | 310/80 |
| 2011/0048147 A1 * | 3/2011 | Keech et al. | ................. | 74/89.26 |

* cited by examiner

*Primary Examiner* — Justin Krause

(74) *Attorney, Agent, or Firm* — Carlson, Gaskey & Olds PC

(57) ABSTRACT

A linear actuation system has two linear actuator channels acting in tandem and a gear housing connecting the two actuator channels and providing an output for the actuation system. The gear housing has multiples gears with at least one gear connected to each actuator and is movable.

6 Claims, 3 Drawing Sheets

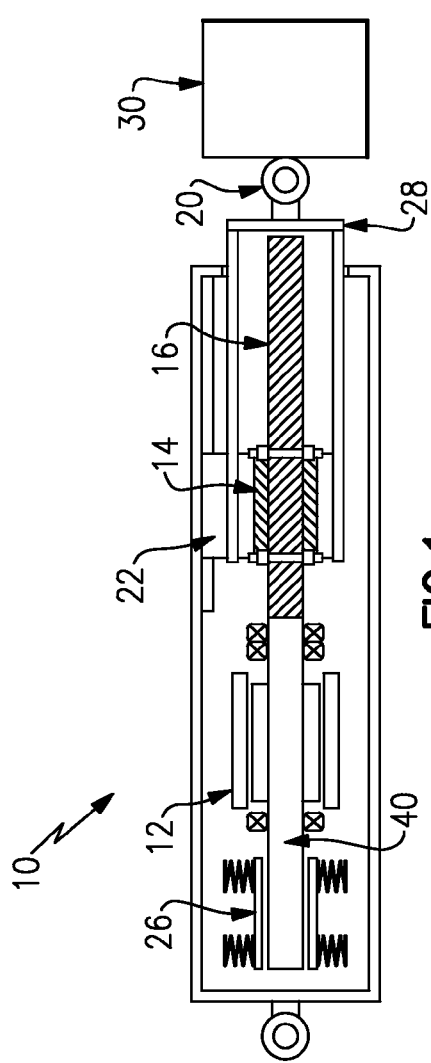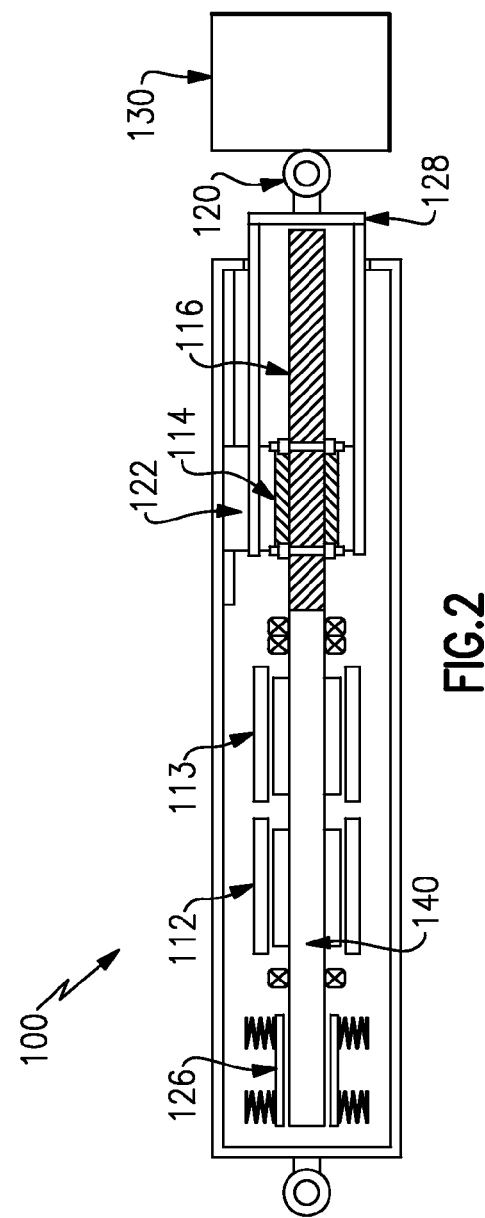

VELOCITY SUMMING LINEAR ACTUATOR

BACKGROUND

The present application is directed toward a linear actuation system and more specifically toward a velocity summing linear actuator.

Linear actuation systems are used in a variety of applications requiring pushing or pulling. In a simple linear actuation system, a rotary motion is generated using an electric or hydraulic motor, and the rotary motion is then converted into linear motion via the use of a screw assembly. Various technologies exist for the screw assembly including Acme or lead screws, ball screws, and roller screws. The present application can be applied using any of these technologies; for simplicity "screw assembly" will be used to describe the application of one of these technologies. In such a system, linear translation is achieved when relative rotation is generated between the screw shaft and nut of the screw assembly. The threads force the nut to move along the screw assembly in a direction depending on the direction of rotation and the direction of the threading.

In certain applications it can be critical to have a linear actuator remain functional after a component failure. In these applications, it is known to use a redundant linear actuation system where the system includes redundant components. Often the redundancy is focused on the motor, sensors, and brake (when used).

SUMMARY

Disclosed is a redundant linear actuation system with a primary and a secondary channel. Each of the channels has a motor which is connected to a first output component. The first output components of each channel are further connected to a second output component. Each channel additionally has a brake which is operable to prevent rotational movement of the motors. Each of the second output components is connected to a sleeve. Each of the sleeves is connected into a movable gear housing.

BRIEF DESCRIPTION OF THE DRAWINGS

The disclosure can be further understood by reference to the following detailed description when considered in connection with the accompanying drawings wherein:

FIG. 1 is a schematic illustration of a prior art, single channel, linear actuator.

FIG. 2 is another schematic illustration of a prior art, dual channel, linear actuator.

DETAILED DESCRIPTION

Figure 3:
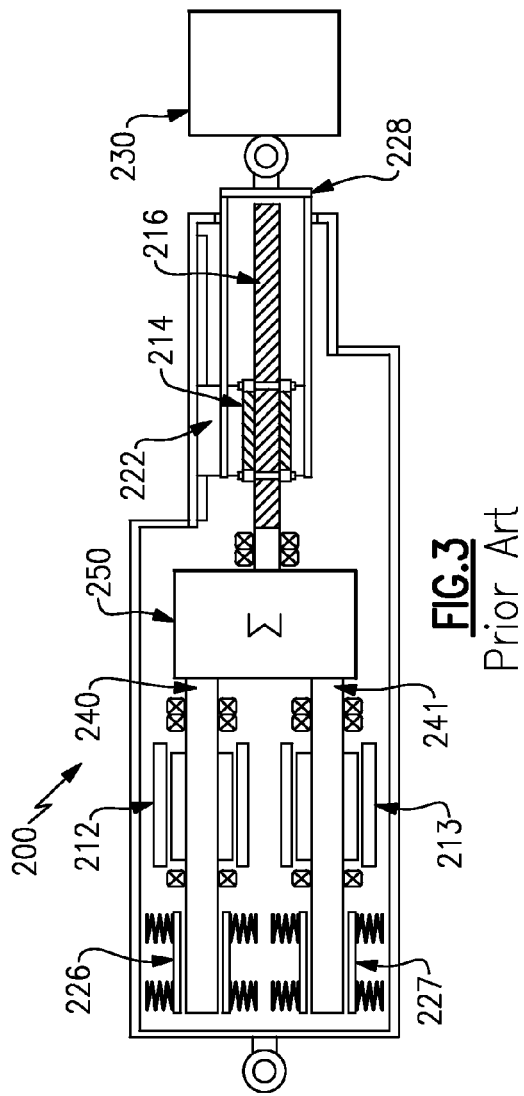
FIG. 3 is another schematic illustration of a prior art, dual channel, velocity summing linear actuator.

FIG. 1 illustrates a prior art linear actuator 10. The prior art linear actuator has an electric motor 12 coupled magnetically to a motor shaft 40, which is attached to a screw shaft 16. The screw shaft 16 has a threaded nut 14 connected to it. A brake 26, is coupled to the motor shaft 40. The nut 14 is movable along the screw shaft 16. The nut 14 is also attached to a sleeve 28 which is incapable of rotation due to an anti-rotation device 22. The sleeve 28, transfers motion of the nut 14 to an output 20 which can be connected to a component 30 (alternately referred to as an object and identified as 130 in FIG. 2, 230 in FIG. 3, 330 in FIG. 4, 430 in FIGS. 5, and 530 in FIG. 6) which needs to be precisely pushed or pulled.

The linear actuator 10 operates such that when the motor 12 is energized it rotates the motor shaft 40 and causes the screw shaft 16 to rotate. This arrangement causes the nut 14 and the attached sleeve 28 to move along the screw shaft 14 either extending or retracting the output 20 depending on the direction of motor rotation. A brake 26 may be operated to lock the motor shaft 40 in place, thereby preventing screw shaft 16, the nut 14 and sleeve 28 from moving when the motor is unpowered. The brake 26 and the motor 12 are controlled by an external controller (not pictured).

Certain linear actuation applications require the actuator to be able to move at all times, even with the failure of certain components. One prior art linear actuation system 100 used to address this condition is illustrated in FIG. 2. The linear actuator 100 employs an electrically redundant two channel actuator. The actuator 100 operates such that when either the primary motor 112 or secondary motor 113 are powered it causes a common motor shaft 140 to rotate. The rotation of the motor shaft 140 causes the screw shaft 116 to rotate. This arrangement causes the nut 114 and the attached sleeve 128 to move along the screw shaft 114 either extending or retracting the output 120 depending on the direction of motor rotation. A brake 126 may be operated to lock the motor shaft 140 in place, thereby preventing screw shaft 116, the nut 114 and sleeve 128 from moving when the motor is unpowered. The brake 126 and the motor 112 are controlled by an external controller (not pictured).

In the system of FIG. 2, if the primary motor 112 fails, the secondary motor 113 is power instead and the actuator continues functioning normally. The non-powered motor will still be rotating causing the motor 112 to act as a generator and generate electrical power which is transmitted back into a control system. The generated electrical power is undesirable.

FIG. 3 illustrates a prior art dual channel velocity summing linear actuation system 200. The actuator 200 has a primary motor 212 coupled with primary motor shaft 240. A primary brake 226 is coupled to the primary motor shaft 240. The actuator 200 also has a secondary motor magnetic 213 coupled with secondary motor shaft 241. A secondary brake 227 is coupled to the secondary motor shaft 241. The primary motor shaft 240 and secondary motor shaft 242 are both coupled to a velocity summing gearbox 250. The velocity summing gearbox is also coupled to a screw shaft 216 such that the screw shaft 216 is rotated at a speed equal to the speed of the primary motor shaft 240 plus the speed of the secondary motor shaft 242. The rotation of the screw shaft 216 causes the nut 214 and the attached sleeve 228 to move along the screw shaft 216 either extending or retracting the output 220 depending on the of sum of the primary motor shaft 240 and secondary motor shaft 241 rotation. The primary motor 212, primary brake 226, secondary motor 213 and secondary brake 227 brake are controlled by an external controller (not pictured).

Under normal operation of the system in FIG. 3 the primary brake 226 is released and the primary motor 212 is energized, causing the primary motor shaft 240 to rotate. The secondary brake 227 is engaged and the secondary motor 213 is unpowered causing the secondary motor shaft 241 to remain zero speed. The state of the primary motor shaft 240 and secondary motor shaft 242 cause the velocity summing gearbox 250 to rotate the screw shaft 216 at a speed equal to the speed of the primary motor shaft 240. If the primary motor 212 fails the primary brake 226 is engaged preventing the primary motor 240 from spinning. The secondary brake 227 is then released and the secondary motor 213 is energized causing the secondary motor shaft 241 to rotate. The state of the primary motor shaft 240 and secondary motor shaft 242 causes the velocity summing gearbox 250 to rotate the screw shaft 216 at a speed equal to the speed of the secondary motor shaft 250, allowing the actuator 200 to continue operation with the failed primary motor 212. The actuator 200 still requires use of an anti-rotation feature 222, which reduces performance of the system. The reduction in performance is undesirable.

Figure 4:
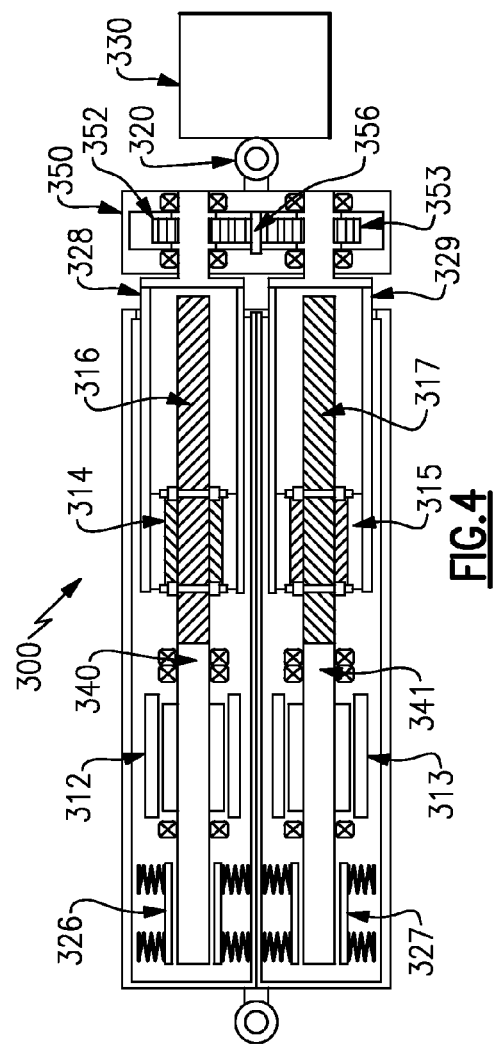
FIG. 4 is a schematic illustration of a first example of a dual channel velocity summing linear actuator.

FIG. 4 illustrates a dual channel velocity summing linear actuation system 300. A primary and secondary channel exist each with a motor 312, 313, brake 326, 327, motor shaft 340, 341, screw shaft 316, 317, nut 314, 315, and sleeve 328, 329 arranged in a similar configuration as in the prior art example of FIG. 1. In the example of FIG. 4, however, the sleeve 328, 329 is not held in place with an anti-rotation device and is capable of rotating. Additionally the nuts 314, 315 are connected to the sleeves 328, 329 and can rotate. Also included in the example of FIG. 3 is a gear housing 350 connecting the two sleeves 328, 329 and the output 320. Each of the sleeves 328, 329 is coupled to a gear 352, 353 within the gear housing 350 and allows rotation of one sleeve 328 to be translated to the other sleeve 329 and visa-versa under specific conditions. An idler gear 356 connects the gears 352, 353 together to allow for the translation of rotation between sleeves 328, 329. The primary screw assembly (screw shaft 316 and nut 314) and secondary screw assembly (screw shaft 317 and nut 315) are threaded in opposite directions.

When both channels are functioning and the primary and secondary motor shafts 340, 341 are rotating at the same speed, the gears 352, 353, 356 in the gear housing 350 allow axial movement of the sleeves 328, 329 without rotating. Thus the nuts 314, 315 do not rotate either. This allows the full rotation of the screw shafts 316, 317 to be translated into linear movement of the nuts 314, 315, sleeves, 328, 329, gear housing 350, and output 320 along the screw shafts 316, 317. Output 320 can be connected to an object 330 which needs to be precisely pushed or pulled, thereby allowing the actuation system 300 to fully control the motion of the object.

In the example linear actuation system 300 illustrated in FIG. 4 when one of the channels fails, the actuator can remain functional. If the primary motor magnetic 312 fails then the corresponding brake 326 is applied, thereby preventing the motor shaft 340 and screw shaft 316 from rotating. When the screw shaft 316 on the non-functioning channel stops rotating, the gears 352, 353 and 356 allow both nuts 314, 315 to rotate due to the rotation of the secondary screw shaft 317. The nut 315 on the secondary channel will begin rotating with the threads of the corresponding screw shaft 317 at half the speed of the screw shaft 317 rotation. The rotation of the nut 315 and the sleeve 329 is then transmitted through the gear housing 350 to the sleeve 328 corresponding to the non-functioning channel. By driving the secondary motor shaft 341 at twice the speed it was running before the failure, the actuator can operate with the failed motor 312.

The sleeve 328 and the nut 314 of the primary channel are caused by the gearing 352, 353, 356 to rotate in the same direction as the sleeve 329 and nut 315 at the same rotational speed. The primary screw assembly (screw shaft 316 and nut 314) and secondary screw assembly (screw shaft 317 and nut 315) are threaded in opposite directions, which results in the nut 314 and sleeve 328 of the primary channel moving along the screw shaft 316 at the same rate of speed, in the same direction, and with the same force as the secondary channel.

Figure 5:
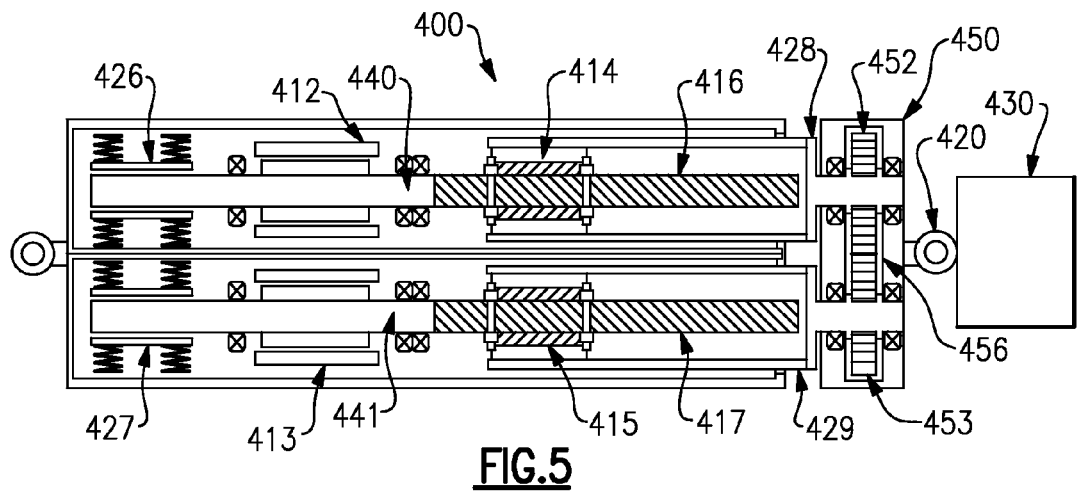
FIG. 5 is a schematic illustration of a second example of a dual channel velocity summing linear actuator.

A failure of the secondary motor 313 instead of the primary motor 312 results in similar operation FIG. 5 illustrates another example linear actuation system. The example of FIG. 5 utilizes a similar configuration to the example of FIG. 4 with two differences. First, the primary screw assembly (screw shaft 416 and nut 414) and secondary screw assembly (screw shaft 417 and nut 415) are threaded in the same direction. The second difference is the gearing 452, 453 contained within the gear housing 450. The gearing 452, 453 of the example of FIG. 5, does not include an idler gear, and is configured in such a way that when the nut 414 or 415 on the functioning channel rotates, the nut 415 or 414 on the non-functioning channel is rotated as well, but in the opposite direction. Since the primary screw assembly (screw shaft 416 and nut 414) and secondary screw assembly (screw shaft 417 and nut 415) are threaded in the same direction the gearing 452, 453 is configured to translate rotational movement of the nut 414 or 415 on the functioning channel into rotational movement of the nut 415 or 414 on the non-functioning channel in the opposite direction. This achieves the same affect as described above with regards to the rotation of the nuts 414 and 415 in FIG. 4 when one channel is in a failed state.

Figure 6:
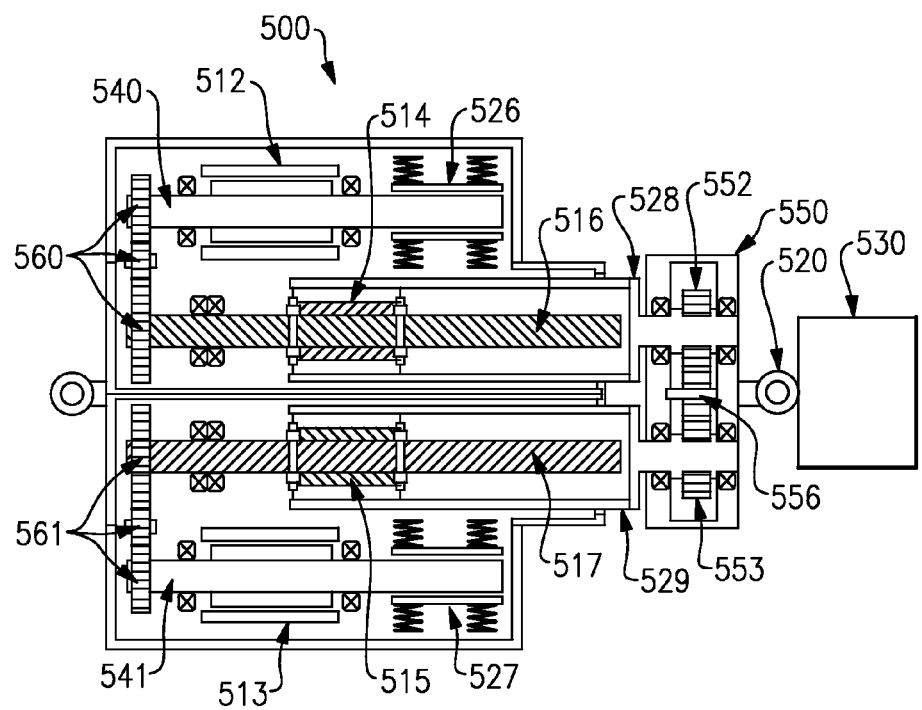
FIG. 6 is a schematic illustration of a third example of a dual channel velocity summing linear actuator.

FIG. 6 illustrates another example actuation system 500. The motor shafts 540, 541 are connected to the screw shafts 516, 517 through a gear set 560, 561. The gear set 560, 561 allows the linear actuation system 500 to have different physical dimensions, while retaining all the functionality described above with regards to the example of FIG. 4. The example of FIG. 6 can be used in any application where the length of the actuation system is a factor or where specific dimensions are required.

Although preferred embodiments have been disclosed, a worker of ordinary skill in this art would recognize that certain modifications would come within the scope of the claims. For that reason, the following claims should be studied to determine their true scope and content.

What is claimed is:

1. A linear actuation system comprising;
   a first linear actuator channel, a second linear actuator channel;
   each of said first linear actuator channel and said second linear actuator channel having a motor connected to a first output component, each of said first output component connected to a second output component, each said first linear actuator channel and second linear actuator channel additionally having a brake operable to selectively prevent rotation of said first output component, wherein each of said first output component is a screw shaft, each of said second output component is a nut, and each of said nuts is threaded onto one of said screw shafts, and wherein said screw shafts of the first and second linear actuators have opposing thread directions;
   each of said second output components connected to a sleeve, wherein each of said sleeves is rigidly connected to one of said nuts such that said sleeve rotates along with said nut;
   a gear housing connected to the first linear actuator channel and the second linear actuator channel, said gear housing comprising at least a first and second gear, wherein said first gear is connected to one of said sleeves and said second gear connected to the other of said sleeves; and
   said gear housing being movable, such that rotational motion of the first output components is converted into linear motion of the gear housing, and wherein said gear housing additionally includes an idler gear connecting said first and second gears such that while said first linear actuator and said second linear actuator are both operational said nuts do not rotate.

2. The linear actuation system of claim 1, wherein each of said motors are mechanically connected to said first output components via gearing.

3. The linear actuation system of claim 1, wherein said first gear is connected to one of said sleeves, such that said first gear is rotated by rotation of said sleeve and said second gear connected to the other of said sleeves such that said second gear is rotated by the other of said sleeves.

4. The linear actuation system of claim 1, wherein each of said first gear and said second gear are contained within said gear housing.

5. The linear actuation system of claim 1, wherein each of said second output components is connected to one of said gears via one of said sleeves.

6. The linear actuation system of claim 1, wherein said brake is a mechanical brake applied to a linear actuator channel shaft.

* * * * *